Aug. 7, 1934.   C. E. CARPENTER   1,968,808
DOUGH FEEDING APPLIANCE AND THE LIKE
Original Filed Jan. 3, 1927   3 Sheets-Sheet 1
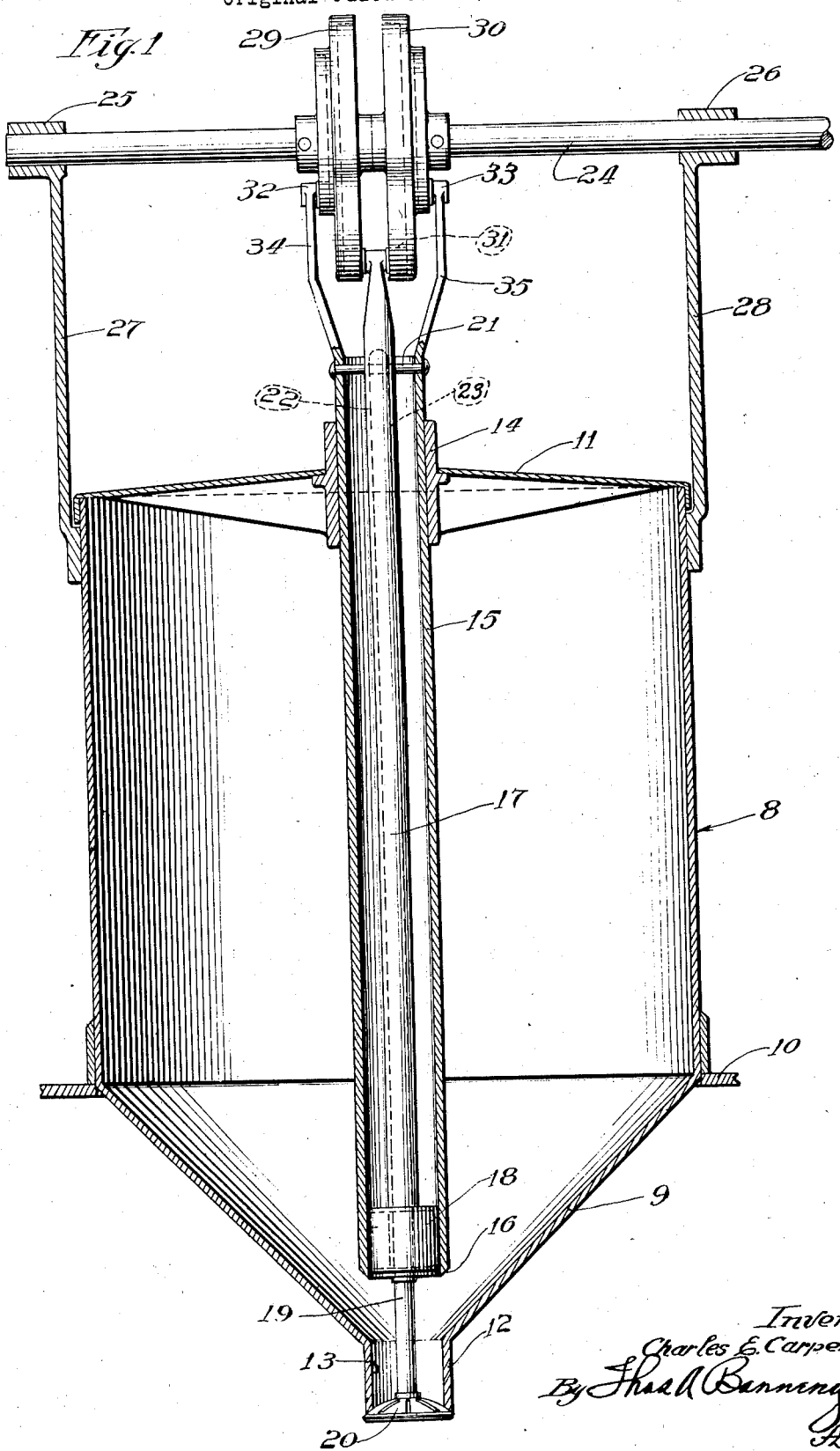

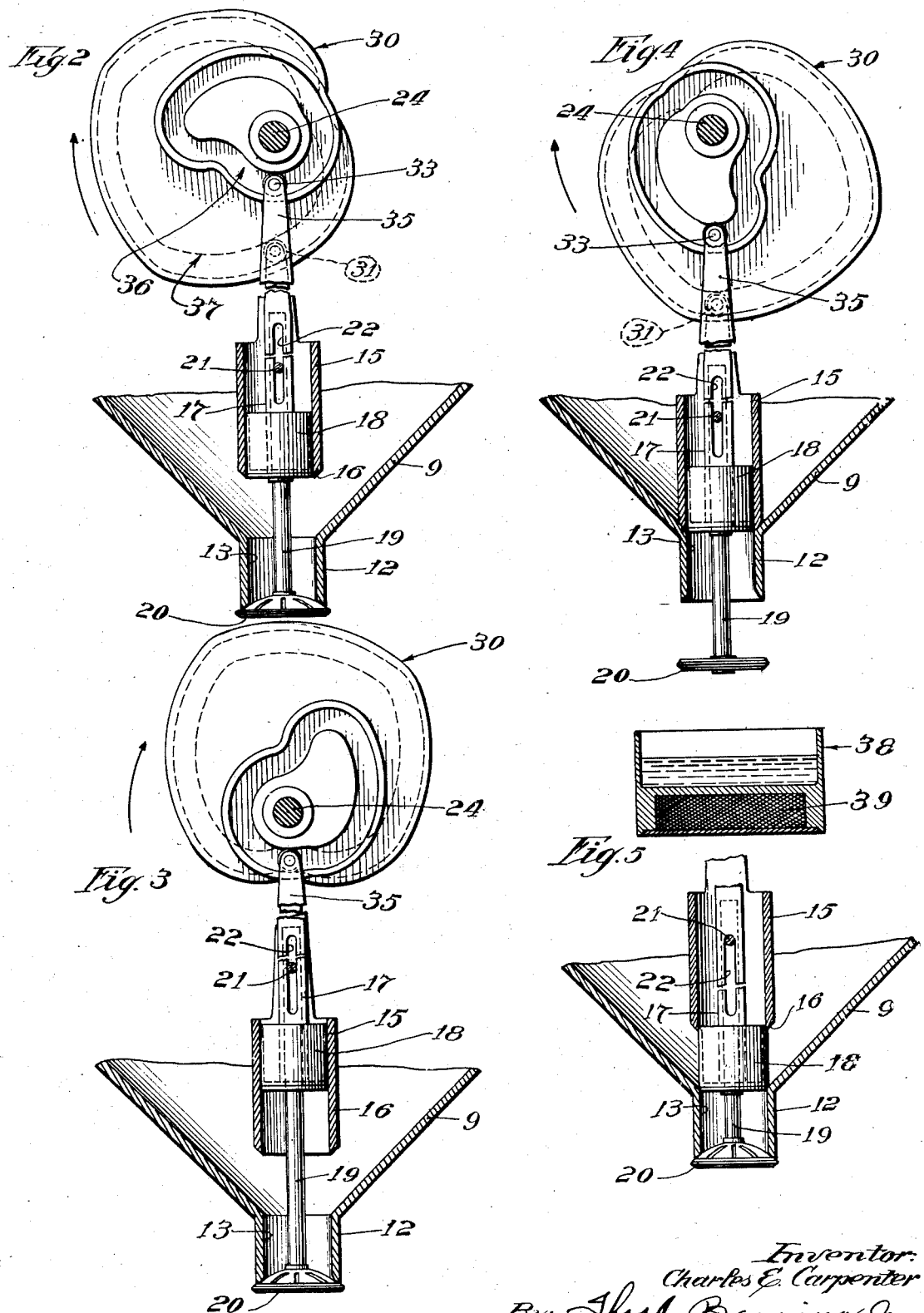

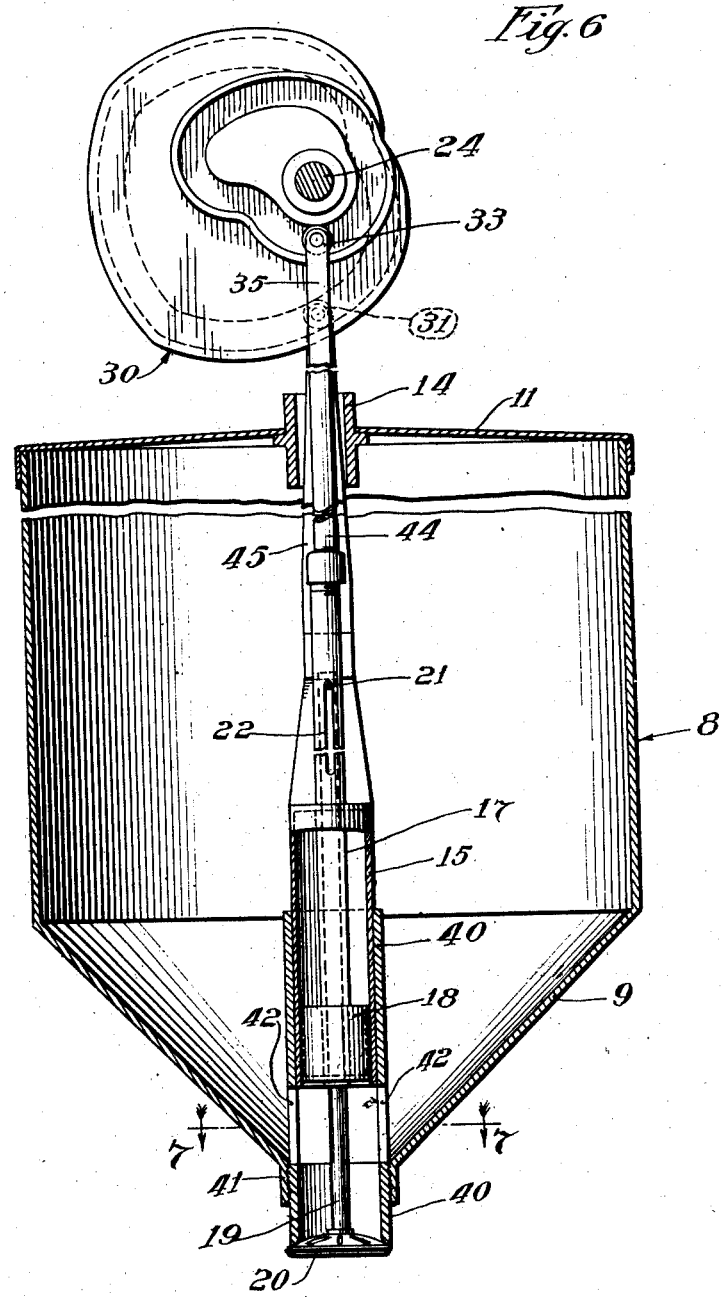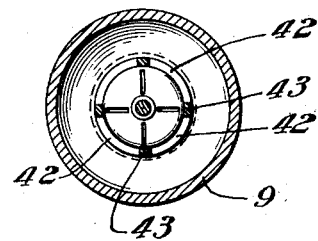

Patented Aug. 7, 1934

1,968,808

UNITED STATES PATENT OFFICE 1,968,808

DOUGH FEEDING APPLIANCE AND THE LIKE

Charles E. Carpenter, Chicago, Ill.

Application January 3, 1927, Serial No. 158,615
Renewed August 15, 1933

10 Claims. (Cl. 107—14)

The present invention has to do with an improved hopper and feeding device for delivering batches of dough. The construction herein disclosed is especially intended for the foregoing purpose in connection with machines for manufacturing doughnuts and other food articles.

The features of the invention are well adapted for use in connection with many kinds of cooking devices; and although the construction herein disclosed is especially intended for the cooking of doughnuts still I do not intend to limit the usefulness thereof except as I may do so in the claims.

In the dough feeding operation the dough must be delivered in relatively small batches of substantially uniform size. These batches are delivered in the first instance from a suitable hopper which contains a relatively large amount of the raw dough. The dough batches are delivered through a suitable orifice and the construction should be such as to cut off the batches at the proper time in the delivering operation.

The dough is relatively stiff and will not flow except under the application of suitable force. In one type of construction with which I am familiar for the feeding of dough batches in the manufacture of doughnuts a suitable air pressure is applied within the hopper which holds the dough supply, and upon opening the proper valve device the dough is forced out by this pressure. The use of air pressure involves complication of structure and arrangement which are undesirable, besides increasing the cost of construction and operation of the machine and entailing the use of additional mechanisms for supplying the compressed air.

One of the objects of the invention is to provide a dough feeding mechanism of such construction and arrangement that the new charge of dough will be drawn into the feeding mechanism by a positive suction action, thus insuring the localization of a full charge of the dough but without the complications attendant upon the use of compressed air to actually force out the dough.

Another object of the invention in connection with the foregoing is to provide means for positively discharging the definite amount or batch of dough localized by the suction mechanism as hereinafter explained.

Another object of the invention is to provide a very simple form of operating mechanism for positively actuating the various parts so as to insure their movements in the proper sequence and in proper timed relationship.

Still a further object of the invention is to provide a construction whereby it is possible to deliver batches of various uniform sizes from a given hopper by merely substituting new operating sleeves from time to time, said sleeves being of uniform external diameter but of different internal diameter according to the sizes of the dough batches which they are intended to deliver.

Other objects and uses of the invention will appear from a detailed description of the same which consists in the features of construction and combinations of parts hereinafter described and claimed.

In the drawings:

Figure 1 shows a vertical elevation through a hopper provided with a simple construction of mechanism embodying the features of the present invention;

Fig. 2 shows a fragmentary vertical section through the lower portion of the hopper having applied thereto the feeding mechanism of the present invention, the latter being shown in its initial position, and this figure also showing diagrammatically the general shape of the cams for actuating the parts in proper timed sequence;

Fig. 3 shows a view similar to that of Fig. 2 with the exception that the plunger has been raised up within the sleeve so as to create a suction and draw in a fresh batch of dough;

Fig. 4 shows a view similar to that of Figs. 2 and 3 with the exception that the sleeve and valve have both been lowered, thereby sealing off the dough batch and isolating the same and at the same time opening the valve, the plunger being lowered so as to force the dough batch out from the sleeve;

Fig. 5 shows a view similar to that of Fig. 4 with the exception that the sleeve and valve have both been raised to their initial position, but the plunger has not yet been raised, and the plunger will be raised during the next operation to the position illustrated in Fig. 2;

Fig. 6 shows a view similar to that of Fig. 1 but illustrates a modified type of construction in which there is provided a removable throat or spout for the lower end of the hopper, so that throats or spouts of different internal diameters can be substituted from time to time in order to provide for the delivery of dough batches of different sizes; and Fig. 7 shows a fragmentary cross section on the line 7—7 of Fig. 6, looking in the direction of the arrows.

Referring first to Fig. 1, the hopper is designated in its entirety by the numeral 8. It preferably has a tapered bottom 9 and is suitably supported by a bracket 10. A removable cover 11 is provided through which the dough can be introduced into the hopper or the hopper can be cleaned.

A spout or throat 12 is located at the lower central portion of the hopper, the same having an internal diameter 13 corresponding to the general size of the dough batch to be delivered.

In the cover 11 is located a collar 14 and a vertical hollow sleeve 15 slides up and down in said collar 14. The lower end 16 of the sleeve 15 is preferably tapered or suitably formed to set into the lower end of the hopper and the internal diameter of the sleeve is preferably the same as the internal size 13 of the neck or throat 12 so that when the sleeve 15 is lowered into the position of Fig. 4 the parts will come into perfect alignment.

Reaching down through the sleeve 15 is another sleeve 17 to the lower end of which is connected a plunger or the like 18. This plunger is of any convenient form including for example a cup leather by means of which a definite air seal is established during normal movements of the plunger within the sleeve 15. Preferably this cup leather faces upwards as shown in Figs. 1 to 6 inclusive since the upward stroke is the suction stroke.

The plunger 18 is provided with a substantially long skirt so that said plunger can override the lower end 16 of the sleeve 15 without disengagement of the plunger from the sleeve.

Within the sleeve 17 there works a vertical pin 19 to the lower end of which is connected a disk valve 20. When said pin 19 is raised into the position of Fig. 1 said disk valve 20 closes the lower end of the neck or throat 12, and by lowering the pin 19 the valve is opened.

The pin 19 and sleeve 15 are connected together and operate as a unit. This connection is established by means of a cross pin 21 reaching from the sleeve 15 and through the upper end of the pin 19. For this purpose the sleeve 17 is slotted as shown at 22 and 23 in Fig. 1. Thus the sleeve 17 with its plunger 18 on the one part can be moved up and down through a substantial vertical distance independently of the pin 19 and sleeve 15 on the other part, the amount of this movement being limited by the slots but sufficient for purposes of operation.

A cross shaft 24 is journaled at the points 25 and 26 to the upper ends of the brackets 27 and 28. This shaft 24 carries a pair of disks 29 and 30. The inner faces of these disks are provided with cam grooves receiving a cross pin 31 connected to the upper end of the sleeve 17, and the outside faces of the disks 29 and 30 receive the pins 32 and 33 on the upper ends of arms 34 and 35 which are connected to the upper end of the sleeve 15. As a result the movements of the sleeve 15 and the valve 20 on the one part can be controlled by the outside cam faces as a unit and the movements of the sleeve 17 and plunger 18 on the other part can be controlled properly and as another unit by the inside cam faces.

Figs. 2, 3, 4 and 5 illustrate cam constructions which are capable of producing the desired results; and in these diagrammatic views the pin and slot connection 21, 22 and 23 is shown near the upper end of the sleeve 15 instead of near its lower end, simply by way of convenience and illustration.

The cams are intended to rotate in the direction of the arrows shown in Figs. 2, 3 and 4. The pin 33 for the outside sleeve 15 works in a side face cam 36, and the pin 31 for the sleeve 17 works in a side face cam 37. It will be noted that continuing the movement from the position of Fig. 2 to that of Fig. 3, the pin 31 is traveling in a concentric section of the cam and therefore in a dwell, thus holding the sleeve 15 and valve 20 in the fixed raised position. However during this movement the pin 31 is traveling within a cam section of constantly diminishing radius thus raising the plunger 18 from the position of Fig. 2 to that of Fig. 3.

Directly after the position of Fig. 3 is passed both of the pins 31 and 33 enter cam sections of constantly increasing radius, but the cam section for the pin 31 increases in radius much more rapidly than the other so that by the time the position of Fig. 4 is reached the plunger 18 has been forced all the way down, while the sleeve 15 has only been forced down far enough to engage the bottom of the hopper.

In passing from the position shown in Fig. 4 to that of Fig. 5, the pin 31 has been traveling in a circular cam section or dwell so that the plunger is retained in the lowermost position; but during this interval the pin 33 has been traveling in a cam section of diminishing radius so that the sleeve 15 and valve 20 are raised.

In passing from the position of Fig. 5 back to that of Fig. 1, the parts are again restored due to the shape of the cam grooves.

For purposes of convenience and illustration I have shown a grease bath 38 beneath the position of the hopper and adapted to receive the dough batches so as to fry the doughnuts. This grease bath may be heated in any convenient manner as by means of a heating element 39 imbedded in its bottom surface.

The construction shown in Figs. 6 and 7 differs from that already described, primarily in the fact that the neck or throat at the lower end of the hopper is removable so that a neck or throat having a different internal diameter can be substituted. For this purpose I have shown a sleeve 40 threaded up through the flange 41 in the lower portion of the hopper. This sleeve 40 itself reaches up some distance into the hopper and acts as a guide for the sleeve 15. The portion of the sleeve 40 inside of the hopper is provided with a series of relatively large openings 42, separated by relatively small vertical partitions 43 so that on the suction stroke of the plunger the dough can be readily drawn through said opening.

The upper portion of the sleeve 15, sleeve 17, and pin 19, are removably connected to pins 44 and 45 which are in turn actuated by the cams aforesaid so that by disconnecting these parts the entire dough feeding valve mechanism can be removed from the hopper as a unit. When this is done another sleeve 40 of different internal diameter can be substituted, and at the same time suitable new valve mechanism may be substituted so that the size of the dough batches can be readily changed without other changes in the machine.

While I have herein shown and described only certain embodiments of the features of my present invention, still I do not intend to limit myself to the same except as I may do so in the claims.

I claim:

1. A machine for feeding batches of dough and similar material, comprising in combination a hopper having its lower end tapered in size and terminating in a downwardly extending discharge throat, a vertically movable sleeve located axially within said hopper and of an internal diameter substantially the same as that of the throat, a suction plunger in the lower portion of said sleeve, said plunger having a relatively long skirt reaching up into the sleeve, a valve for the lower open end of the throat, a common connection joining together the valve and the sleeve to cause them to reciprocate vertically in unison, and operating means for moving the plunger and for moving the valve and sleeve vertically, effectively to first raise the plunger within the sleeve to thereby draw a batch of dough up into the lower end of the sleeve by suction, and thereafter move the sleeve and valve downwardly effectively to bring the lower end of the sleeve into engagement with the hopper at the position of the upper end of the throat and force the plunger downwards to thereby expel the dough batch through the lower open end of the throat, and thereafter to raise the sleeve and valve while retaining the plunger in lowered position, to thereby cut off and perforate the delivered dough batch, substantially as described.

2. A machine for feeding batches of dough and similar material comprising in combination a hopper for said material having at its lower end a discharge throat through which the batches of material are discharged, a vertically movable sleeve within the hopper having its lower end adapted to engage the hopper around the position of said throat, said sleeve having an internal diameter approximately the same as that of the throat, a plunger working within the sleeve and having a relatively long skirt, a valve for the lower open end of the throat, and means for reciprocating the sleeve, plunger, and valve in timed relationship, to thereby raise the plunger within the sleeve while retaining the sleeve in raised position above the floor of the hopper, to thereby draw a fresh batch of dough into the sleeve, thereafter lowering the sleeve into engagement with the hopper at the position of the throat and lower the valve into open position, thereafter moving the plunger downwards in the sleeve to discharge the batch of dough through the throat, and thereafter raising the sleeve and valve while retaining the plunger in the lowered position substantially as described.

3. A machine for feeding batches of dough or similar material comprising in combination a hopper for the material, a discharge throat at the lower end of said hopper, a vertically movable sleeve within the hopper, adapted to engage the floor of the hopper at the position of the throat, a suction plunger within the lower portion of the sleeve having a relatively long skirt reaching upwards into the sleeve, and a vertically reciprocating valve for the lower end of the throat, together with means for positively reciprocating all of said parts including said valve vertically and in timed relationship, to thereby first draw a batch of dough up into the lower end of the sleeve, by suction, thereafter delivering said batch of dough downwardly through the throat, and thereafter cut off and perforate said batch upon delivery from the throat, substantially as described.

4. A machine for feeding batches of dough or similar material comprising in combination a hopper having in its lower central portion a discharge opening, a cylinder and plunger in the lower portion of the hopper, a vertically reciprocable valve for the hopper discharge opening aforesaid, means for positively moving said valve to closed position and simultaneously drawing the plunger into the cylinder to thereby draw a batch of dough into the cylinder, means for presenting the cylinder with said dough batch to the delivery opening, and means for forcing out the plunger and simultaneously moving the valve to open position to thereby deliver the batch of dough from the cylinder through the opening, substantially as described.

5. In a doughnut machine: a dough hopper; a dough chamber provided with an inlet which communicates with said hopper through a lateral opening gate means for closing said lateral opening, said chamber being provided also with a bottom outlet opening; and a plunger member disposed in said outlet opening and adapted to reciprocate relatively thereto,—said outlet plunger member being movable by means comprising a rod which upwardly projects from said dough chamber.

6. In a doughnut machine: a dough hopper; a dough chamber provided with an inlet which communicates with said hopper through a lateral opening, gate means for closing said lateral opening, said chamber being provided also with a bottom outlet opening; and a lower plunger member disposed in said outlet opening and adapted to reciprocate relatively thereto,—said dough chamber comprising an upper plunger which is movable by means comprising a tubular member through which extends a lower plunger-operating rod.

7. In a machine of the class described, the combination of a dough hopper having a downwardly extending delivery throat in its lower portion, a stationary sleeve extending upwardly within the hopper in alignment with the throat aforesaid and said sleeve having its lower end spaced above the upper end of the throat to permit entry of dough from the hopper into the throat during the proper operation, a valve member working in alignment with and to a point below the lower end of the throat, an operating rod extending from said valve member upwardly through the sleeve aforesaid, a plunger member working in alignment with and to a point above the upper end of the throat and into the sleeve aforesaid, and operating means for said plunger member extending upwardly through the sleeve aforesaid, the plunger member having a vertical dimension sufficient to overlap the lower end of the sleeve aforesaid when the plunger member is at its lowermost position of movement and having a size such as to maintain sealing engagement with the member surrounding said plunger member at all times, whereby the upper end of the plunger member never communicates directly with the dough within the hopper nor receives dough on its upper end face, substantially as described.

8. In a machine of the class described, the combination of a dough hopper having a downwardly extending delivery throat in its lower portion, a sleeve extending upwardly within the hopper in alignment with the throat aforesaid and said sleeve having its lower end spaced at times above the upper end of the throat to permit entry of dough from the hopper into the throat during the proper operation, a valve member working in alignment with and to a point below the lower end of the throat, an operating rod extending from said valve member upwardly through the sleeve aforesaid, a plunger member working in alignment with and to a point above the upper end of the throat and into the sleeve aforesaid, operating means for said valve member and said plunger member extending upwardly through the sleeve and serving to operate said parts in proper harmony, and the plunger member having a vertical dimension sufficient to overlap the lower end of the sleeve aforesaid when the plunger member is at its lowermost position of movement and having a size such as to maintain sealing engagement with the member surrounding said plunger member at all times, whereby the upper end of the plunger member never communicates directly with the dough within the hopper nor receives dough on its upper end face, substantially as described.

9. In a machine of the class described, the combination of a dough hopper having a downwardly extending delivery throat in its lower portion, a sleeve extending upwardly within the hopper in alignment with the throat aforesaid and said sleeve having its lower end spaced at times above the upper end of the throat to permit entry of dough from the hopper into the throat during the proper operation, a valve member working in alignment with and to a point below the lower end of the throat, an operating connection extending from said valve member upwardly through the sleeve aforesaid, a plunger member working in alignment with and to a point above the upper end of the throat and into the sleeve aforesaid, operating connections for said plunger member extending upwardly through the sleeve aforesaid, and the plunger member having parts working in sealing engagement with the sleeve aforesaid during the entire range of movement of the plunger member, whereby the upper end of the plunger member never communicates directly with the dough within the hopper nor receives dough on its upper end face, substantially as described.

10. In a machine of the class described, the combination of a dough hopper, a downwardly extending delivery throat, a stationary sleeve, said sleeve having its lower end spaced above the upper end of the throat to permit entry of dough from the hopper into the throat during the proper operation, a valve member working in alignment with and to a point below the lower end of the throat, an operating rod extending from said valve member upwardly through the sleeve aforesaid, a plunger member working in alignment with and to a point above the upper end of the throat and into the sleeve aforesaid, and operating means for said plunger member extending upwardly through the sleeve aforesaid, the plunger member having a vertical dimension sufficient to overlap the lower end of the sleeve aforesaid when the plunger member is at its lowermost position of movement and having a size such as to maintain sealing engagement with the member surrounding said plunger member at all times, whereby the upper end of the plunger member never communicates directly with the dough within the hopper nor receives dough on its upper face, substantially as described.

CHARLES E. CARPENTER.